United States Patent [19]

Nakauchi et al.

[11] Patent Number: 4,725,397

[45] Date of Patent: Feb. 16, 1988

[54] THERMOSETTING PREFORM HAVING SUPERIOR TRANSPARENCY AND PROCESS FOR PRODUCING MOLDED ARTICLES FROM SAID PREFORM

[75] Inventors: Jun Nakauchi, Tokyo; Shunsuke Minami, Kawasaki, both of Japan

[73] Assignee: Mitsubishi Rayon Co., Ltd., Tokyo, Japan

[21] Appl. No.: 802,161

[22] Filed: Nov. 25, 1985

[30] Foreign Application Priority Data

Nov. 26, 1984 [JP] Japan .................................. 59-248931
Nov. 28, 1984 [JP] Japan .................................. 59-252565

[51] Int. Cl.$^4$ ...................... C08F 224/00; B29C 39/10
[52] U.S. Cl. ............................... 264/331.12; 264/319; 264/320; 264/347; 526/273; 526/318.4; 526/318.45; 526/318.5; 526/937
[58] Field of Search ................. 526/273, 318.2, 318.3, 526/318.4, 318.45, 318.5, 937; 264/319, 320, 331.12, 331.18, 347

[56] References Cited

U.S. PATENT DOCUMENTS 2,604,463  7/1952  Bilton et al. .......................... 526/273
4,051,194  9/1977  Ishikawa et al. ................. 526/273 X
4,407,895 10/1983  Nakauchi et al. ................. 526/273 X

OTHER PUBLICATIONS

Patents Abstracts of Japan, vol. 7, No. 285, (C-201), [1430], 20th Dec., 1983; & JP-A-58 164 607 (Toray K.K.) 29-09-1983.

*Primary Examiner*—Joseph L. Schofer
*Assistant Examiner*—F. M. Teskin
*Attorney, Agent, or Firm*—Oblon, Fisher, Spivak, McClelland & Maier

[57] ABSTRACT

This invention provides novel thermosetting preform having superior transparency which is composed of the resin produced by partially polymerizing the mixture of (A) 4 to 30 wt % of at least one vinyl monomer containing carboxyl group, (B) 4 to 96 wt % of at least one vinyl monomer containing glycidyl group, and (C) up to 92 wt % of at least one copolymerizable monomer, said preform being characterized in that the amount of unreacted monomer remaining therein is less than 20 wt % and the glass transition temperature range is 120° C. or lower. This invention also provides a method of production of a highly transparent molded article with high productivity which is superior in heat resistance and in chemical resistance by heating and molding said preform.

8 Claims, No Drawings

THERMOSETTING PREFORM HAVING SUPERIOR TRANSPARENCY AND PROCESS FOR PRODUCING MOLDED ARTICLES FROM SAID PREFORM

The present invention relates to a transparent thermosetting preform. More particularly, it relates to a thermosetting preform suitable for making glazing and optical components such as glasses, lenses, and prisms which require high transparency, heat resistance, and chemical resistance. It also relates to a process for producing highly transparent molded articles which are superior in heat resistance and in chemical resistance from said preform.

Inorganic glass has been mainly used for glazing, glasses, and various optical components. However, it has been replaced partly by polycarbonate, polystyrene, and polymethyl methacrylate which are thermoplastic resins or by diethylene glycol bisallylcarbonate resin which is a thermosetting resin (disclosed in U.S. Pat. No. 2,542,386).

The conventional inorganic glass for glazing, glasses, and optical components is superior in heat resistance and in chemical resistance to organic plastics, but has a disadvantage of being heavy and brittle. On the other hand, polycarbonate, polystyrene, and polymethyl methacrylate, which are thermoplastic resins, are light in weight and easy to process, but are inferior in heat resistance and in chemical resistance.

Although diethylene glycol bisallylcarbonate resin is comparatively better in heat resistance and in chemical resistance, it has disadvantages of being poor in productivity and dimensional accuracy. These disadvantages come from the processing method so called monomer casting and curing, which requires a long heat setting time after pouring the monomer into a mold and incurs volume shrinkage during curing time.

The present inventors carried out a series of researches in a search for a material which has both the advantages of thermoplastic resins—good productivity and processability—and the advantages of thermosetting resins—heat resistance and chemical resistance, and also for a suitable process for molding such a material. As a result, it was found that it is possible to efficiently produce transparent molded articles having superior heat resistance and chemical resistance if a transparent thermosetting preform is used as mentioned below and it is molded in an inovative manner.

Accordingly, it is an object of the present invention to provide a transparent thermosetting preform having superior in heat resistance and chemical resistance and to provide a process for producing a molded articles from such a preform.

The gist of this invention resides in a thermosetting preform having good transparency which is composed of the resin by polymerizing partially the mixture of (A) 4 to 30 wt. % of at least one vinyl monomer containing carboxyl group, (B) 4 to 96 wt. % of at least one vinyl monomer containing glycidyl group, and (C) up to 92 wt. % of at least one copolymerizable monomer, said preform being characterized in that the amount of unreacted monomer remaining therein is less than 20 wt. % and the glass transition temperature is 120° C. or lower, and also in a process for producing molded articles by heat curing said preform.

Component (B) as a cross-linkable monomer having glycidyl group and component (A) as a hardener having carboxyl group used in the present invention react little each other below 120° C.

The transparent themosetting preform of the present invention is in a solid state at room temperature range and easy to handle.

The apparently solid preform becomes soft thermoplastic state in a mean time at 150° C. or above and it undergoes thermosetting reaction to cure.

Thus it is able to be molded by the molding technology of conventional thermoplastic resins, in spite of being inherently thermosetting resin.

Because of this feature, the preform of the present invention gives a great improvement in productivity.

Examples of component (A) (vinyl monomer containing carboxyl groups) include methacrylic acid, acrylic acid, itaconic acid, and crotonic acid. Examples of component (B) (vinyl monomer containing glycidyl groups) include glycidyl acrylate, glycidyl methacrylate, β-methylglycidyl acrylate, and β-methylglycidyl methacrylate. Preferable example among them is a monomer containing a β-methylglycidyl group, which undergoes curing reaction with the carboxyl group at the conventional temperature range and is thermally stable at a relatively lower temperature range of producing a preform.

Examples of component (C) (copolymerizable monomers used in combination with the above-mentioned cross-linkable monomers) include methyl methacrylate, ethyl methacrylate, n-propyl methacrylate, isopropyl methacrylate, n-propyl methacrylate, isobutyl methacrylate, sec-butyl methacrylate, t-butyl methacrylate, 2-ethylhexyl methacrylate, methyl acrylate, ethyl acrylate, n-propyl acrylate, isopropyl methacrylate, n-propyl methacrylate, styrene, α-methylstyrene, 2,2,2-trifluoroethyl methacrylate, and 2,2,3,3,3-pentafluoropropyl methacrylate.

The amount of component (A) should be at least 4 wt. % and the amount of component (B) should be not less than 4 wt. % and not more than 96 wt. % in the preform; otherwise, the molded articles obtained by curing the preform at 150° C. or above are inferior in heat resistance and in chemical resistance due to a low degree of cross linking, or it is poor in transparency due to foaming. Also, the amount of component (A) should be not more than 30 wt. % and; otherwise, the resulting molded atricles are poor in dimensional accuracy due to increased moisture absorption. Thus the amount of component (A) and component (B) in the preform should be 4 to 30 wt. % and 4 to 96 wt. %, preferably 7 to 25 wt. % and 7 to 80 wt. %, respectively.

The amount of unreacted monomers remaining in the preform should be less than 20 wt. %; otherwise, the preform is hard to handle because the softening point goes down to make the preform more sticky and deformable.

Transparent thermosetting preform of this invention should preferably be produced by bulk polymerization which may be initiated by radical initiators such as azobisisobutironitrile, azobis-γ-valeronitrile, benzoyl peroxide, and lauroyl peroxide which work in the intermediate temperature range. Chain transfer agents such as n-dodecyl mercaptan, n-octyl mercaptan, n-butyl mercaptan, and t-butyl mercaptan are also used in the reaction to produce the preforms. The amount of initiator and chain transfer agent and the polymerization conditions should be properly established according to the known technology so that the amount of residual monomer is less than 20 wt. %. The polymerization temperature should preferably be lower than 100° C. so that thermosetting reaction between component (A) and component (B) is minimized.

The thermosetting preform with excellent transparency of this invention is molded and cured at suitable temperature range to be made into a molded articles.

The heat molding should preferably be carried out in a short time at temperatures at least 150° C. Typical examples of the preferred methods are described below. At first, the preform is cut to a proper size according to the desired dimensions of the molded articles. The preform is rapidly heated to a temperature of at least 150° C. by means of an infrared heater and then pressed it in a mold or clamped under pressure between two halves of a mold heated to at least 150° C. During the molding step, thermosetting reaction takes place and molding proceeds. Unlike the casting process to cure monomer, the above-mentioned process provides molded articles of accurate dimensions in a short time because it involves very little volume shrinkage resulting from polymerization, and gives high productivity because the curing reaction is finished in a short time. This is a feature of the process of this invention. The preheating of the preform before a molding should be as short as possible at 150° C. or higher to avoid premature thermosetting reaction.

The preform of this invention is designed molecularly as a transparent glassy themosetting resin in the room temperature range, and it is moldable at 150° C. or above the same as the themroplastic resin. The compression method and other practical molding method may be applied to molding of the preform with high productivity in large quantities. The molded and heat cured articles obtained from the preform of this invention are superior in heat resistance, chemical resistance, and in dimensional stability because of the crosslinked structure, and have the advantages of both the conventional thermoplastic resins and thermosetting resins.

The inventions are now illustrated by the following examples.

EXAMPLE 1

A polymerization solution was prepared by mixing 20 parts by weight of methacrylic acid, 80 parts by weight of β-methylglycidyl methacrylate, 0.05 parts by weight of azobisisobutyronitrile, and 0.15 parts by weight of n-octyl mercaptan. The polymerization solution was poured into the casting mold which was formed by fixing two tempered glass sheets covered with 50 μm thick film made of polytetrafluoroethylene, with a spacer of PVC tube (5 mm in outside diameter) interposed between them. The casting mold was immersed in a constant temperature water bath at 70° C. for 14 hours. Thus transparent thermosetting preform sheet with a 4 mm thick was obtained.

The glass transition temperature of the preform sheet was measured at a frequency of 110 Hz by using Dynamic Viscoelastometer (RHEOVIBRON DDV III-EA; Toyo Baldwin Co., Ltd.). The peak temperature of complex modulus (E") was 85° C. In order to determine the residual monomer content in the preform sheet, a part of the preform sheet was dissolved in chloroform and the resulting solution was analyzed by gas chromatography. The amount of residual monomer was 10 wt. %.

The preform sheet thus prepared was cut into a piece with 30 square mm, and the piece was pressed between two flat plates heated to 200° C. and held under a pressure of 70 kg/cm2 for 10 minutes. After cooling and demolding, a piece of heat cured sheet about 200 μm thick was obtained. The peak temperature of complex modulus (E") of the sheet measured by the viscoelastometer was 180° C.

The heat cured sheet was dipped in acetone and in methylene chloride at room temperature for one day. No apparent change was observed on the surface of the sheet. This indicates that the sheet had good chemical resistance. The transmittance of visible rays of the sheet was measured by means of a spectrophotometer. The tramsmittance in the wave length range from 400 to 800 nm was higher than 90%, which corresponded to the transparency of polymethyl methacrylate.

EXAMPLE 2

A transparent thermosetting preform sheet with a thickness of 4 mm was prepared in the same manner as in Example 1 by polymerizing the solution composed of 20 parts by weight of methacrylic acid, 40 parts by weight of β-methylglycidyl methacrylate, 40 parts by weight of methyl methacrylate, 0.05 parts by weight of azobisisobutyronitrile, and 0.15 parts by weight of n-octyl mercaptan.

The peak temperature of complex modulus (E") of the perform sheet was 90° C. and the amount of residual monomer in the sheet was 9.0 wt. %, which were measured by the same method as shown in Example 1. The preform sheet was compressed under the same conditions as in Example 1. The cured sheet with a thickness of 190 μm was obtained. The peak temperature of complex modulus (E") of the cured sheet measured by the viscoelastometer was 178° C.

The cured sheet was dipped in acetone and in methylene chloride at room temperature for one day. No change was detected on the surface of the sheet. This indicates that the sheet had good chemical resistance. The transmittance of the sheet for visible light measured by the same method as in Example 1 was higher than 90%.

EXAMPLE 3

A transparent thermosetting preform sheet with 4 mm thick was prepared by the same method as in Example 1 by polymerizing the solution composed of 15 parts by weight of itaconic acid, 40 parts by weight of β-methylglycidyl acrylate, 45 parts by weight of methyl methacrylate, 0.05 parts by weight of azobisisobutyronitrile, and 0.15 parts by weight of n-octyl mercaptan.

The peak temperature of complex modulus (E") of the sheet was 60° C. and the amount of residual monomer in the sheet was 10.0 wt. %, which were measured by the same methods as in Example 1. The preform sheet was compressed under the same conditions as in Example 1, and a cured sheet with a thickness of 160 μm was obtained. The peak temperature of complex modulus (E") of the sheet measured by the same method as in Example 1 was 160° C.

The cured sheet was dipped in acetone and in methylene chloride at room temperature for one day. No change was observed on the surface of the sheet. This indicates that the sheet had good chemical resistance. The transmittance of the sheet for visible rays was higher than 90% measured by the same method as in Example 1.

COMPARATIVE EXAMPLE 1

A transparent thermosetting preform sheet with a 4 mm thick was prepared in the same manner as in Example 1 by polymerizing the solution composed of 3 parts by weight of methacrylic acid, 47 parts by weight of β-methylglycidyl methacrylate, 50 parts by weight of methyl methacrylate, 0.05 parts by weight of azobisisobutyronitrile, and 0.15 parts by weight of n-octyl mercaptan.

The peak temperature of complex modulus (E'') of the preform sheet was 87° C. and the amount of residual monomer in the sheet was 10 wt. %, which were measured by the same methods as in Example 1. The preform sheet was formed into a 150 μm thick heat-cured sheet by compression molding under the same conditions as in Example 1. The peak temperature of complex modulus (E'') of the heat cured sheet measured by the same method as in Example 1 was 110° C.

The heat-cured sheet was dipped in acetone and in methylene chloride at room temperature for one day. Swelling and cracking were observed on the surface of the sheet.

COMPARATIVE EXAMPLE 2

A transparent thermosetting preform sheet with 4 mm thick was prepared in the same manner as in Example 1 by polymerizing the solution composed of 20 parts by weight of methacrylic acid, 3 parts by weight of β-methylglycidyl methacrylate, 77 parts by weight of methyl methacrylate, 0.05 parts by weight of azobisisobutyronitrile, and 0.15 parts by weight of n-octyl mercaptan.

The peak temperature of complex modulus (E'') of the preform sheet was 100° C. and the amount of residual monomer in the sheet was 8 wt. %, which were measured by the same methods as in Example 1 respectively. The preform sheet was formed into a 140 μm thick heat-cured sheet by compression molding under the same conditions as in Example 1. The peak temperature of complex modulus (E'') of the sheet measured by the same method as in Example 1 was 115° C.

The heat-cured sheet was dipped in acetone and in methylene chloride at room temperature for one day. Swelling and cracking were observed on the surface of the sheet.

COMPARATIVE EXAMPLE 3

A transparent thermosetting preform sheet was prepared by the same method as in Example 1 except that the amount of n-octyl mercaptan was changed to 0.3 parts by weight and the polymerization time was changed to 2 hours. The obtained preform sheet was too soft and sticky to be released from the casting mold. The amount of residual monomer in the sheet was 35 wt. %.

COMPARATIVE EXAMPLE 4

The same thermosetting preform sheet as in Example 1 was formed into a 1 mm thick sheet by compression molding by the same method as in Example 1 except that the mold temperature was changed to 140° C. The peak temperature of complex modulus (E'') was 110° C.

The heat-cured sheet was dipped in acetone and in methylene chloride at room temperature for one day. Swelling and cracking were observed on the surface of the sheet.

COMPARATIVE EXAMPLE 5

A transparent thermosetting preform sheet with a 4 mm thick was prepared in the same manner as in Example 1 by polymerizing a solution composed of 20 parts by weight of methacrylic acid, 80 parts by weight of β-methylglycidyl methacrylate, 0.05 parts by weight of di-t-butyl peroxide, and 0.10 parts by weight of n-octyl mercaptan, except that the constant temperature bath was kept at 120° C.

The peak temperature of complex modulus (E'') was 140° C., which was measured in the same manner as in Example 1. The amount of residual monomer in the preform sheet was unmeasurable because of low solubility in a solvent. The preform sheet was unable to be compression-molded under the same conditions as in Example 1 due to low deformability.

COMPARATIVE EXAMPLE 6

A transparent thermosetting preform sheet with a thickness of 4 mm by the same method as in Example 1 by polymerizing the solution composed of 3 parts by weight of methacrylic acid, 3 parts by weight of β-methylglycidyl methacrylate, 94 parts by weight of methyl methacrylate, 0.05 parts by weight of azobisisobutyronitrile, and 0.15 parts by weight of n-octyl mercaptan.

The peak temperature of complex modulus (E'') of the sheet was 91° C. and the amount of residual monomer in the sheet was 8.0 wt. %, which were measured by the same methods as in Example 1 respectively. The preform sheet was formed into a 130 μm thick heat-cured sheet by compression molding under the same conditions as in Example 1. The peak temperature of complex modulus (E'') of the sheet measured by the same method as in Example 1 was 112° C.

The heat-cured sheet was dipped in acetone and in methylene chloride at room temperature for one day. Swelling and cracking were observed on the surface of the sheet.

What is claimed is:

1. A thermosetting resinous preform sheet having superior transparency, comprising:
   (A) 4 to 30 wt. % of at least one vinyl monomer selected from the group consisting of methacrylic acid, acrylic acid, itaconic acid and crotonic acid; and
   (B) 40 to 96 wt. % of β-methylglycidyl methacrylate; and
   wherein said thermosetting resinous preform sheet contains greater than 0 but less than 20 wt. % of unreacted monomer and has a glass transition temperature of 120° C. or less.

2. The thermosetting resinous preform sheet of claim 1, wherein said thermosetting resinous preform sheet contains between 9–20 wt. % of unreacted monomer.

3. The thermosetting resinous preform sheet of claim 1, further comprising at least one copolymerizable monomer selected from the group consisting of esters of an alcohol, having a saturated alkyl group of 4 or less carbon atoms, with (meth)acrylic acid, 2,2,2-trifluoroethyl methacrylate, styrene and α-methylstyrene.

4. A process for producing molded articles which comprises heating and molding a thermosetting resinous preform sheet having high transparency which comprises:
   (A) 4 to 30 wt. % of at least one vinyl monomer selected from the group consisting of methacrylic acid, acrylic acid, itaconic acid and crotonic acid; and (B) 40 to 96 wt. % of β-methylglycidyl methacrylate; and wherein said thermosetting resinous preform sheet contains greater than 0 but less than 20 wt. % of unreacted monomer and has a glass transition temperature of 120° C. or less.

5. A process for producing molded articles in claim 4, wherein the molding is accomplished by heat curing at a temperature of 150° C. or above.

6. A process for producing molded articles in claim 4, wherein the preform is rapidly heated to a temperature of 150° C. or above and pressed against a mold for heat molding.

7. A process for producing molded articles in claim 4, wherein the molding is accomplished by clamping under pressure the preform between molds heated to 150° C. or above.

8. Molded articles obtained by the process of claim 4.

* * * * *